US008105719B2

(12) United States Patent
Belharouak et al.

(10) Patent No.: US 8,105,719 B2
(45) Date of Patent: Jan. 31, 2012

(54) ANODE MATERIAL FOR LITHIUM BATTERIES

(75) Inventors: Ilias Belharouak, Westmont, IL (US); Khalil Amine, Downers Grove, IL (US)

(73) Assignee: UChicago Argonne, LLC, Chicago, IL (US)

(*) Notice: Subject to any disclaimer, the term of this patent is extended or adjusted under 35 U.S.C. 154(b) by 0 days.

(21) Appl. No.: 13/031,498

(22) Filed: Feb. 21, 2011

(65) Prior Publication Data
US 2011/0151330 A1 Jun. 23, 2011

Related U.S. Application Data

(63) Continuation of application No. 12/156,286, filed on May 30, 2008, now Pat. No. 7,919,207, which is a continuation of application No. 10/741,248, filed on Dec. 18, 2003, now Pat. No. 7,390,594.

(60) Provisional application No. 60/435,135, filed on Dec. 19, 2002.

(51) Int. Cl.
H01M 4/58 (2010.01)
H01M 4/50 (2010.01)
H01M 4/505 (2010.01)
(52) U.S. Cl. .......... 429/231.95; 429/231.1; 429/231.5; 429/231.6; 429/231.9; 429/218.1; 429/224; 423/599; 252/182.1
(58) Field of Classification Search .................. None
See application file for complete search history.

(56) References Cited

U.S. PATENT DOCUMENTS
6,051,340 A 4/2000 Kawakami et al.
2003/0211395 A1 11/2003 Licht FOREIGN PATENT DOCUMENTS
JP 2263711 10/1990
JP 2001-126727 5/2001
JP 2001-126728 5/2001

OTHER PUBLICATIONS

Chen, et al., Studies of Mg-Substituted $Li_{4-x}Mg_xTi_5O_{12}$ Spinel Electrodes ($0 \leq x \leq 1$) for Lithium Batteries, *Journal of the Electrochemical Society*, vol. 148, No. 1, 2001, pp. A102-A104.
Koseva et al. "A New Strontium Lithium Titanium Oxide, $SrLi_2Ti_6O_{14}$: Crystal Growth and Structure Determination", *2002 Verlag der Zeitschrift für Naturforschung*, Tübingen, pp. 512-518.
Thackeray, Michael, "Spinel Electrodes for Lithium Batteries", *Journal of the American Ceramic Society—Thackeray* vol. 82, No. 12, 1999, pp. 3347-3354.
Tong et al., "Catalytic Behavior of Doped $MTiO_3$ Catalysts for Oxidative Dehydrogenation of Ethane", *Journal of Natural Gas Chemistry*, vol. 7, No. 4, 1998, pp. 283-367.

*Primary Examiner* — Barbara Gilliam
*Assistant Examiner* — Angela Martin
(74) *Attorney, Agent, or Firm* — Foley & Lardner LLP

(57) ABSTRACT

Primary and secondary Li-ion and lithium-metal based electrochemical cell systems. The suppression of gas generation is achieved through the addition of an additive or additives to the electrolyte system of respective cell, or to the cell itself whether it be a liquid, a solid- or plasticized polymer electrolyte system. The gas suppression additives are primarily based on unsaturated hydrocarbons.

11 Claims, 11 Drawing Sheets

ANODE MATERIAL FOR LITHIUM BATTERIES

This application is a continuation application of U.S. patent application Ser. No. 12/156,286, filed on May 30, 2008, now U.S. Pat. No. 7,919,207, which in turn is a continuation of U.S. patent application Ser. No. 10/741,248, filed Dec. 18, 2003, now U.S. Pat. No. 7,390,594, which in turn claims the benefit of U.S. Provisional Patent Application No. 60/435,135, filed on Dec. 19, 2002, all of which are incorporated herein by reference, for any and all purposes.

GOVERNMENT RIGHTS

The United States Government has rights in this invention pursuant to Contract No. W-31-109-ENG-38 between the United States Department of Energy and UChicago Argonne, LLC.

BACKGROUND

Rechargeable lithium battery technology has become an important source in providing new, lightweight and high energy density batteries for many applications growing with the electronic industry. These batteries have gained increased attention because of their possible utilization for high power applications such as hybrid electric vehicles. The $Li_xC_6/Li_{1-x}CoO_2$ cell is widely commercialized, and is also the best known lithium ion battery cell chemistry in which $Li_{1-x}CoO_2$ plays the role of the cathode or positive electrode while $Li_xC_6$ acts as the anode or negative electrode. Theoretically during the charge, lithium ions can be extracted from the layered structure of $LiCoO_2$ and then inserted into the carbonaceous structure, leading to the formation of $CoO_2$ and $Li_6C$ the hypothetical phases. At the top of the charge, highly lithiated carbon or graphite is a very reactive material, particularly in the case of cells made of cathodes containing nickel and flammable organic electrolytes. Therefore, there is a major concern to address the issue of the safety of the cells which leads to introducing $Li_4Ti_5O_{12}$ as an alternative to carbon.

$Li_4Ti_5O_{12}$ has a spinel structure and can be written as $Li_{8a}[Ti_{1.67}Li_{0.33}]_{16d}O_4$. Lithium is inserted into the structure, and then the rock-salt phase $[Li_2]_{16c}[Ti_{1.67}Li_{0.33}]_{16d}O_4$ is generated. Hence, a two-phase reaction provides a constant voltage at 1.5V versus lithium metal. A major disadvantage of a $Li_4Ti_5O_{12}$ electrode is its insulating character because it has poor electronic and ionic conductivities, which seriously limit its utilization for high rates application as a preferred anode. As a solution, several attempts of doping this material with materials such as $Mg^{2+}$, $Al^{3+}$ have been reported in order to improve its electronic conductivity.

SUMMARY

To address this issue, this invention presents for the first time $M^{II}Li_2Ti_6O_{14}$ (M=Sr, Ba and those of the strontium metal series) as a new generation of non carbonaceous anode material with an original type structure.

Only two materials have been reported in strontium lithium titanium oxide phases. $SrTiO_3$, in which $Li^+$ is partially substituted for $Ti^{4+}$ ($SrTi_{0.9}Li_{0.1}O_{3-x}$), is a selective catalyst for oxidative dehydrogenation of lower alkanes. $Sr_{0.4}Li_{0.6}Ti_2O_4$ has also been developed as a superconductor oxide. Recently, $SrO$—$TiO_2$—$LiBO_2$ has been studied in a ternary system to determine the concentration and temperature range of spontaneous crystallization of $SrTiO_3$. By accident, an unknown phase was found which later was attributed to a new $SrLi_2Ti_6O_{14}$ phase. The structure of $SrLi_2Ti_6O_{14}$ is very attractive and presents a lot of cavities which could allow rapid lithium ion diffusion within the host. $SrLi_2Ti_6O_{14}$ is therefore expected to be a very good ionic conductor, although it should be electronically an insulating material because all the titanium ions are tetravalent, during the first charge $Ti^{4+}$ is reduced to $Ti^{3+}$ which leads to a mixed-valent electronically conducting $SrLi_{2+x}Ti_6O_{14}$. For these reasons, this material is expected to be a very promising non carbonaceous anode materials for lithium ion battery applications that need high capabilities and enhanced safety.

DETAILED DESCRIPTION OF THE PREFERRED EMBODIMENTS

Compositions of matter, articles of manufacture and methods for manufacture are set forth herein for preparation of battery electrodes and a non-aqueous lithium ion battery.

Figure 2:
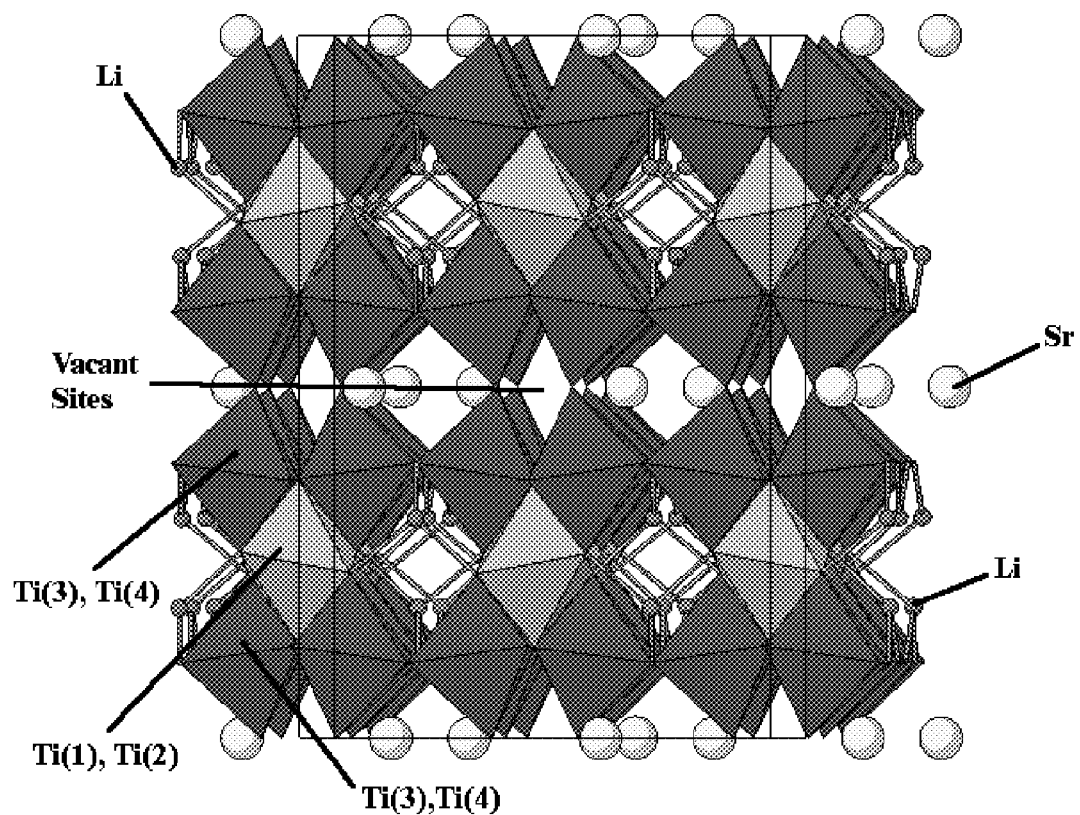
FIG. 2 shows the structure of $SrLi_2Ti_6O_{14}$.

To that end, $MLi_2Ti_6O_{14}$ (M=Sr, Ba) ceramics have been prepared by solid state reaction, starting from a mixture of strontium carbonate $SrCO_3$ or barium carbonate $BaCO_3$, lithium carbonate $Li_2CO_3$ and titanium (IV) oxide $TiO_2$ anatase. The mixture was heated at 5° C./min up to 800° C. to allow a complete decomposition of the carbonates with evolution of $CO_2$. After grinding, the powder was sintered at 950° C. for 24 h. The resulting white polycrystalline powder was examined by X-ray diffraction to check purity of the obtained phase, as shown in FIG. 2.

The positive electrode was prepared by mixing $MLi_2Ti_6O_{14}$ (M=Sr, Ba) with 10 wt % carbon SP and 10 wt % PVdF binder in NMP solvent. The resulting paste was spread on copper foil. The electrolyte was 1 M $LiPF_6$ in (1:1) ethylene carbonate (EC) and diethyl carbonate (DEC) solvents. The cells were assembled inside a helium-filled dry-box and were evaluated using coin-type cells (CR2032: 1.6 cm$^2$). The charge/discharge measurements were carried out between 0.5 and 2V potential range under 0.2 mA/cm$^2$ current density.

Description of Preferred $SrLi_2Ti_6O_{14}$ Structure $SrLi_2Ti_6O_{14}$ belongs to the $SrO$—$Li_2O$—$TiO_2$ ternary system. The unit cell is orthorhombic (Space group: Cmca, Z=8

Figure 1:
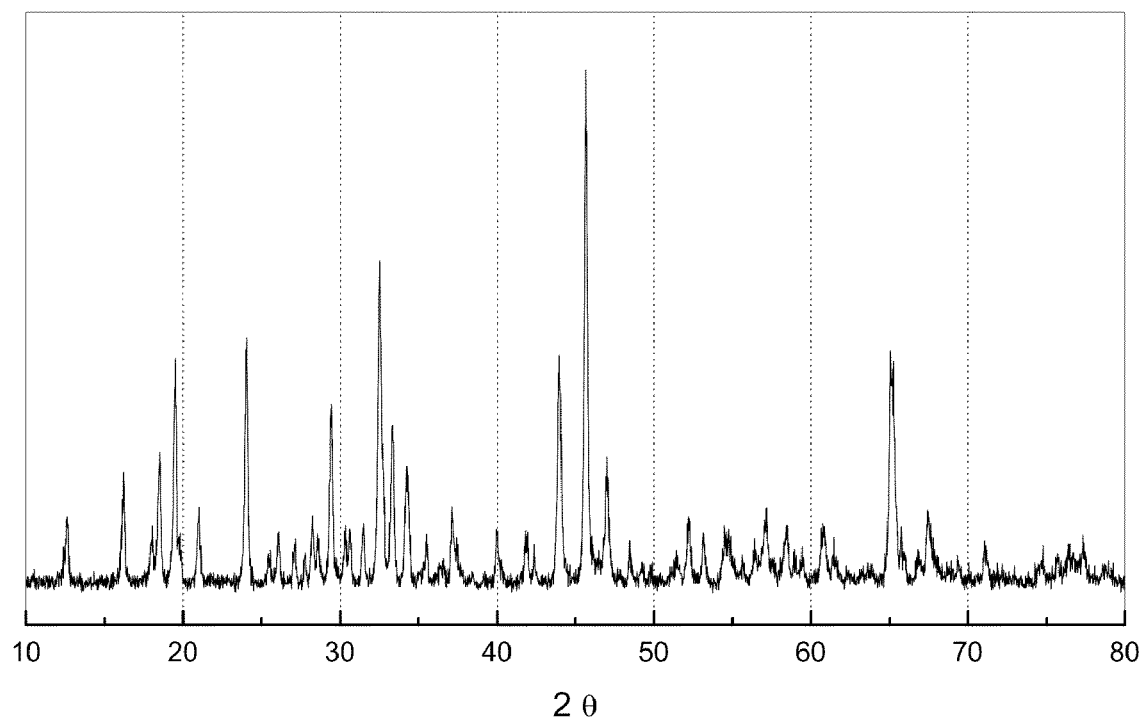
FIG. 1 is a plot showing the X-ray pattern of $SrLi_2Ti_6O_{14}$ made at 950° C.

L) with the following crystalline parameters: a=16.570, b=11.15 and c=11.458 Å. The structure of $SrLi_2Ti_6O_{14}$ is built by edge and corner sharing $[TiO_6]$ octahedra which form layers parallel to (100) plane. The consecutive layers are linked by sharing common corners along the a axis. The details of this unique structure are shown in FIG. 1.

Titanium Environment

A titanium atom is located preferably at a six fold oxygenated site in four different crystallographic positions. Ti(1) and Ti(2) octahedra share common edges which form $[AX_4]$ chains running along c direction. The remaining Ti(3) and Ti(4) octahedra are bounded by a common edge forming $[A_2X_7]$ group which shares common corners with similar group forming a layer along (100) plane. The parallel $[AX4]$ chains containing Ti(1) and Ti(2) octahedra are situated between $[A_2X_7]$ layers and are linked to each others by common corners.

Lithium Environment

The lithium atom is preferably located in a tetrahedral oxygenated site sharing two oxygen atoms with [Ti(1),Ti(2)] titanium chain and two others with [Ti(3),Ti(4)] titanium layer. As it can be seen in FIG. 1, lithium atoms are isolated from each others and occupy tunnels within $[TiO_6]$ framework along the c direction.

Strontium Environment

The strontium atoms are situated in between every three consecutive $[TiO_6]$ chains and layers. They are coordinated to eleven oxygen atoms which form polyhedrons of triply capped distorted cube (FIG. 2).

Electrochemical Data of $SrLi_2Ti_6O_{14}$

Figure 3:
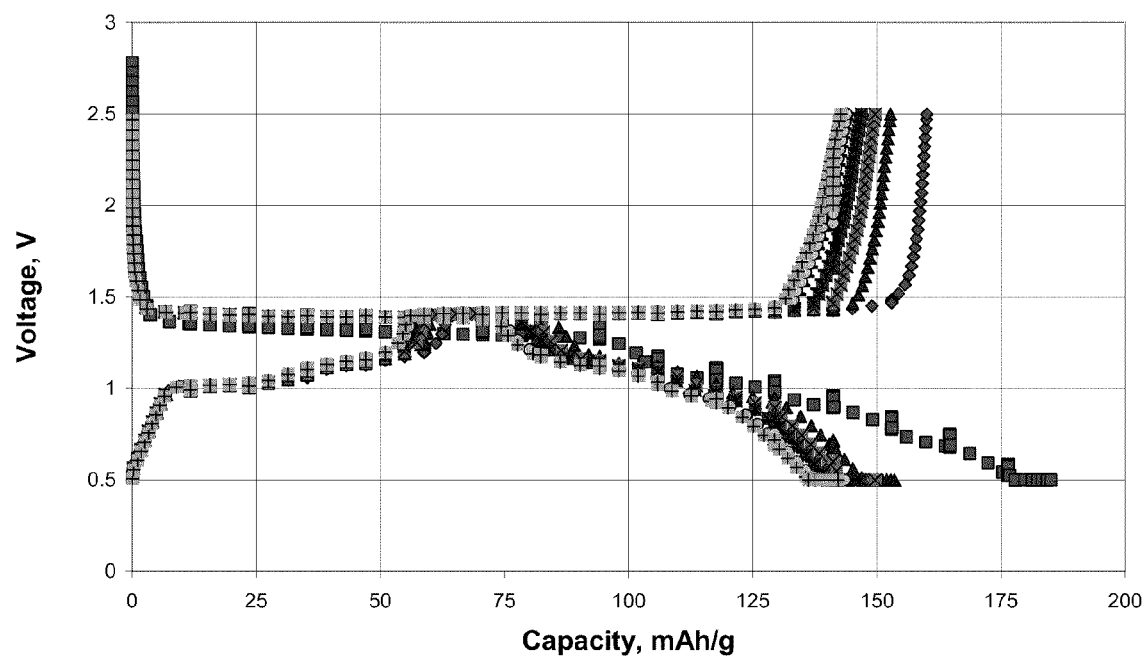
FIG. 3 is a plot showing the voltage profile of a $Li/SrLi_2Ti_6O_{14}$ cell for the first 35 cycles.

FIG. 3 shows the voltage profile of a $Li/SrLi_2Ti_6O_{14}$ cell. Four lithium ions are insertable into $SrLi_2Ti_6O_{14}$ leading to $SrLi_6Ti_6O_{14}$ according to the following general reaction:

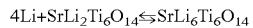

According to this reaction, $SrLi_2Ti_6O_{14}$ provides a total theoretical capacity of 175 mAh/g.

Figure 4:
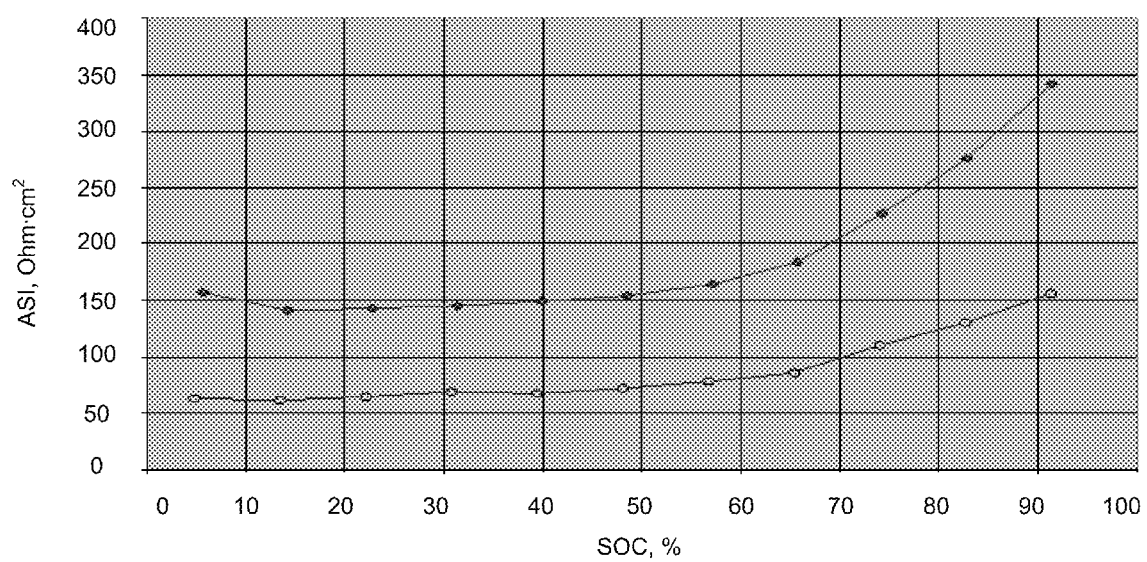
FIG. 4 is a plot showing the area-specific impedance (ASI) as function as state of charge for a $Li/SrLi_2Ti_6O_{14}$ cell and a $Li_4Ti_5O_{12}$ cell.
Figure 5:
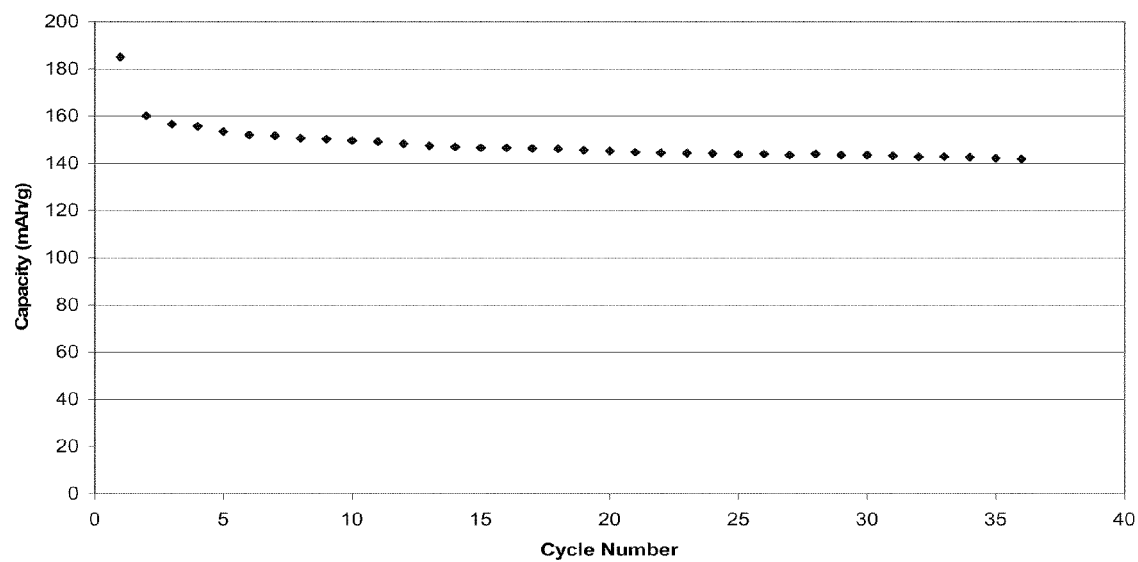
FIG. 5 is a plot showing the delivered charge capacity (mAh/g) of a $Li/SrLi_2Ti_6O_{14}$ cell.
Figure 6:
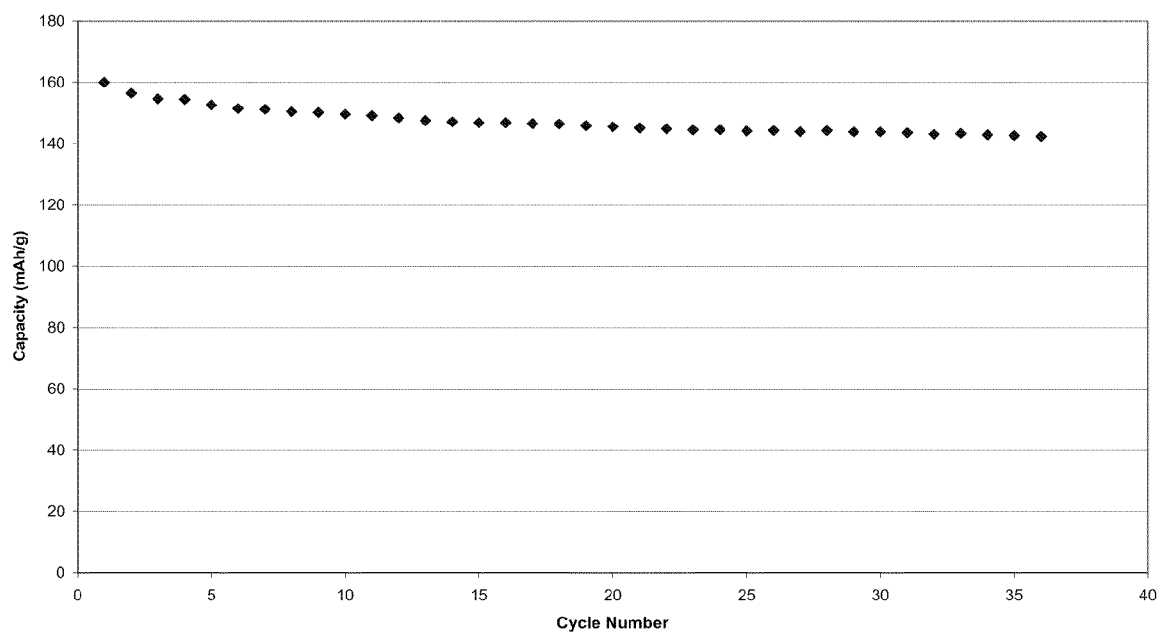
FIG. 6 is a plot showing the delivered discharge capacity (mAh/g) of a $Li/SrLi_2Ti_6O_{14}$ cell.

FIG. 4 shows the areas specific impedance (ASI) of the $Li/SrLi_2Ti_6O_{14}$ cell. The ASI of this material is around 60Ω·cm² which is much lower than that of $Li_4Ti_5O_{12}$, which is around 150Ω·cm². As a result, the $SrLi_2Ti_6O_{14}$ should exhibit much better rate performance as well as sustainable cycling characteristics than $Li_4Ti_5O_{12}$. For the subsequent cycles, the capacity is much more stable and reaches 140 mAh/g constantly up to 35 cycles under C/5 rate.

To establish the electrochemical behavior of $SrLi_2Ti_6O_{14}$ anode material in reel cell chemistry, cells with two cathodes were chosen to be built: $Li(Ni_{1/3}Co_{1/3}Mn_{1/3})O_2$ layered oxide and $LiNi_{0.5}Mn_{1.5}O_2$ spinel material.

Electrochemical Data of $Li(Ni_{1/3}Co_{1/3}Mn_{1/3})O_2/SrLi_2Ti_6O_{14}$ Cell $Li(Ni_{1/3}Co_{1/3}Mn_{1/3})O_2$ belongs to the list of layered oxide materials having an α-NaFeO₂ structure type. This cathode has certain specificities which make it a very promising cathode for many battery applications. The predominant oxidation states of Ni, Co and Mn in the compound are $2^+$, $3^+$ and $4^+$ respectively, which means that the capacity of 150 mAh/g delivered in the range 3-4.3V is mostly arising from the oxidation of $Ni^{2+}$ to $Ni^{3+}$, with a limited $Ni^{4+}$ generation at that cutoff voltage. During the charge/discharge process, $Mn^{4+}$ ions are intact, leading to the cohesion and the stability of the structure because of the strong covalency of Mn—O bonds. Furthermore, a $LiNi^{2+/3+}_{1/3}Co^{3+}_{1/3}Mn^{4+}_{1/3}O_2$ configuration is very suitable for Li-ion batteries since there is no generation of highly oxidizing and unstable $Ni^{4+}$ ions, which play a major role in the mechanism of failure of the battery.

Figure 7:
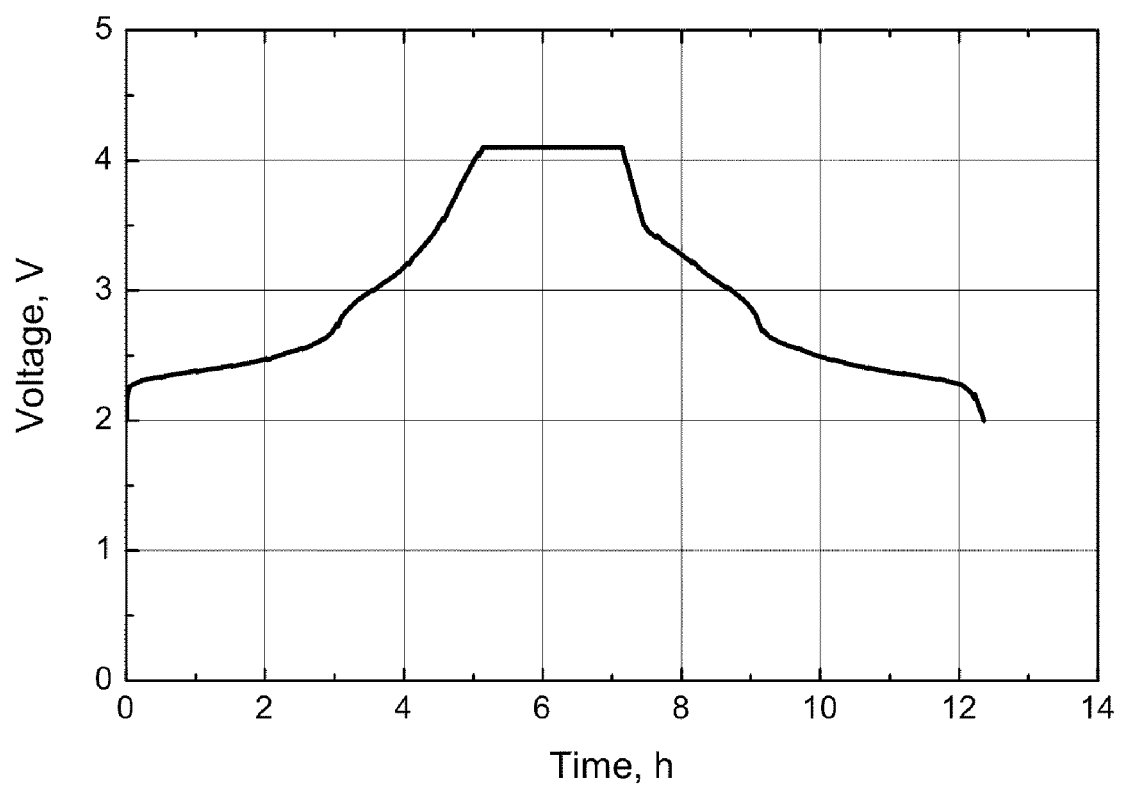
FIG. 7 is a plot showing the voltage profile of a $Li((Ni_{1/3}Co_{1/3}Mn_{1/3})O_2/SrLi_2Ti_6O_{14}$ cell.
Figure 8:
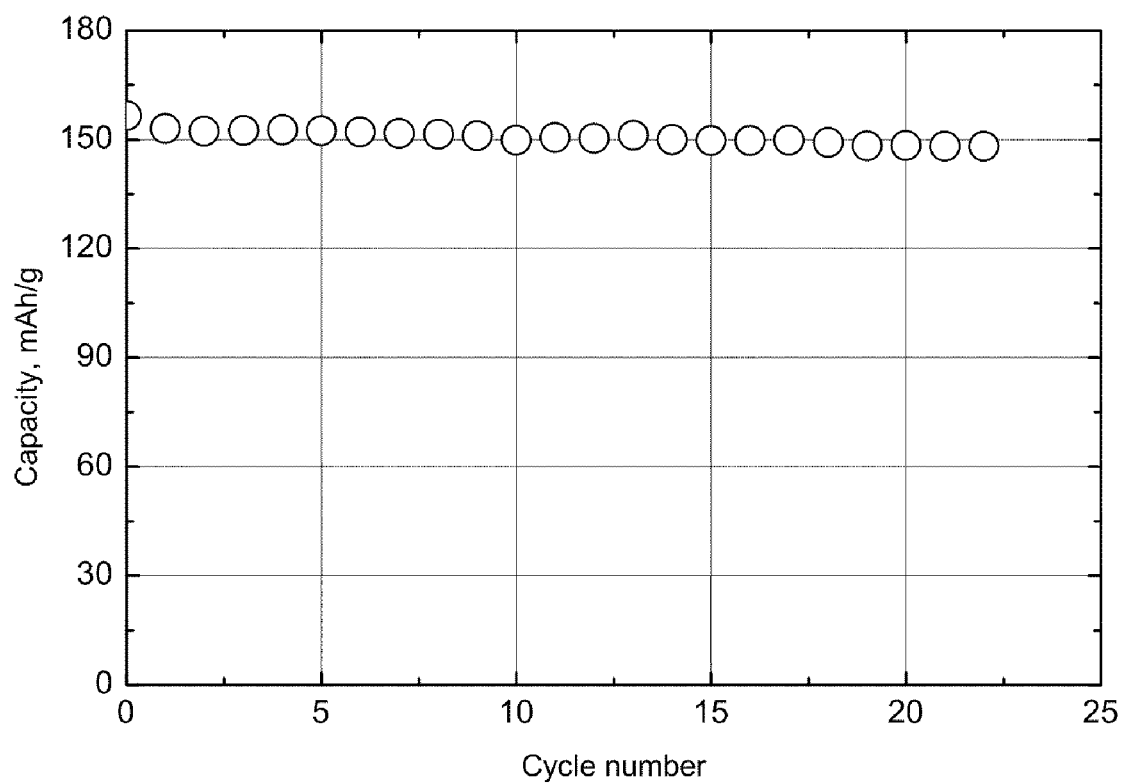
FIG. 8 is a plot showing the delivered discharge capacity (mAh/g) of a $Li(Ni_{1/3}Co_{1/3}Mn_{1/3})O_2/SrLi_2Ti_6O_{14}$ cell (C/5 rate.)

FIG. 7 shows the voltage profile between a 2 and 4.1 V voltage range of a cell made of $Li(Ni_{1/3}Co_{1/3}Mn_{1/3})O_2$ as a positive electrode and $SrLi_2Ti_6O_{14}$ as a negative electrode. The cell delivers a specific discharge capacity of 150 mAh/g at a C/5 rate. This capacity is not affected during subsequent cycle as seen in FIG. 8.

Figure 9:
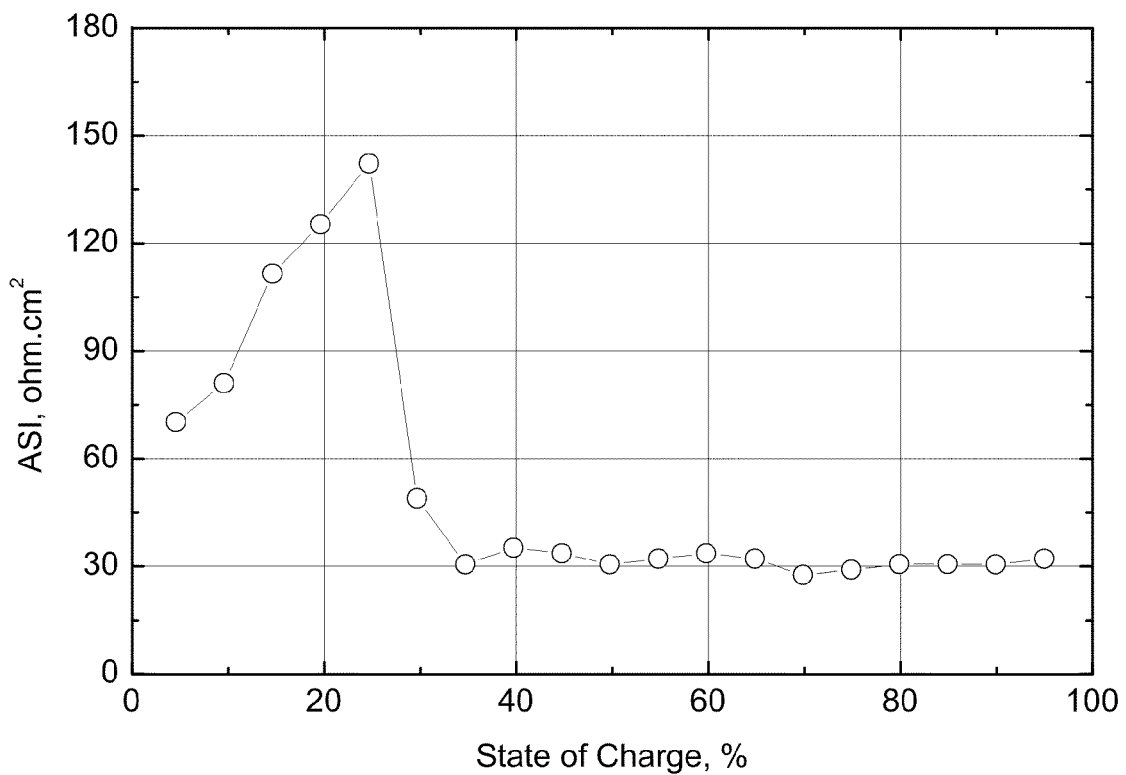
FIG. 9 is a plot showing the area-specific impedance (ASI) as a function as state of charge of a $Li(Ni_{1/3}Co_{1/3}Mn_{1/3})O_2/SrLi_2Ti_6O_{14}$ cell.

FIG. 9 represents the area specific impedance (ASI) of a cell built with $Li(Ni_{1/3}Co_{1/3}Mn_{1/3})O_2/SrLi_2Ti_6O_{14}$. These very low ASI values meet the preferred requirement established for a high power application such as hybrid electric vehicle.

Electrochemical Data of $LiNi_{0.5}Mn_{1.5}O_4/SrLi_2Ti_6O_{14}$ Cell $LiMn_2O_4$ is a well known spinel cathode which has been widely studied for high energy battery application. The practical 100 mAh/g of this cathode is achieved at 4.3 V cutoff voltage. However, $LiMn_2O_4$ base cell chemistry encounters many problems that affect the cycle and the calendar life of the battery, such as the manganese dissolution during the charge/discharge processes. $LiNi_{0.5}Mn_{1.5}O_4$ oxide formulation is an exception among the spinel family designated for the battery technology. The electrochemical reaction occurs at high voltage as to give raise to a flat plateau at 4.7 V. At the top of the charge, the material is able to deliver up to 140 mAh/g.

To improve the electronic conductivity of $SrLi_2Ti_6O_{14}$ and hence its electrochemical performances, many methods could be employed. For example, this could be accomplished by the partial reduction of $Ti^{4+}$ cations to $Ti^{3+}$ cations by various mechanisms, including the preparation under reduced atmospheres such as $H_2$, $H_2/N_2$, $CO_2/CO$ and similar environments. The material could also be coated with one or combination of different conductive metals, such as Cu, Ag, Fe and Ti, metal oxides including aluminum oxide, iron oxide, cupper oxide, titanium oxide, vanadium oxide, nickel oxide, and silver oxide and/or carbonaceous compounds. Additionally, various combinations of the these methods could also be used.

Figure 10:
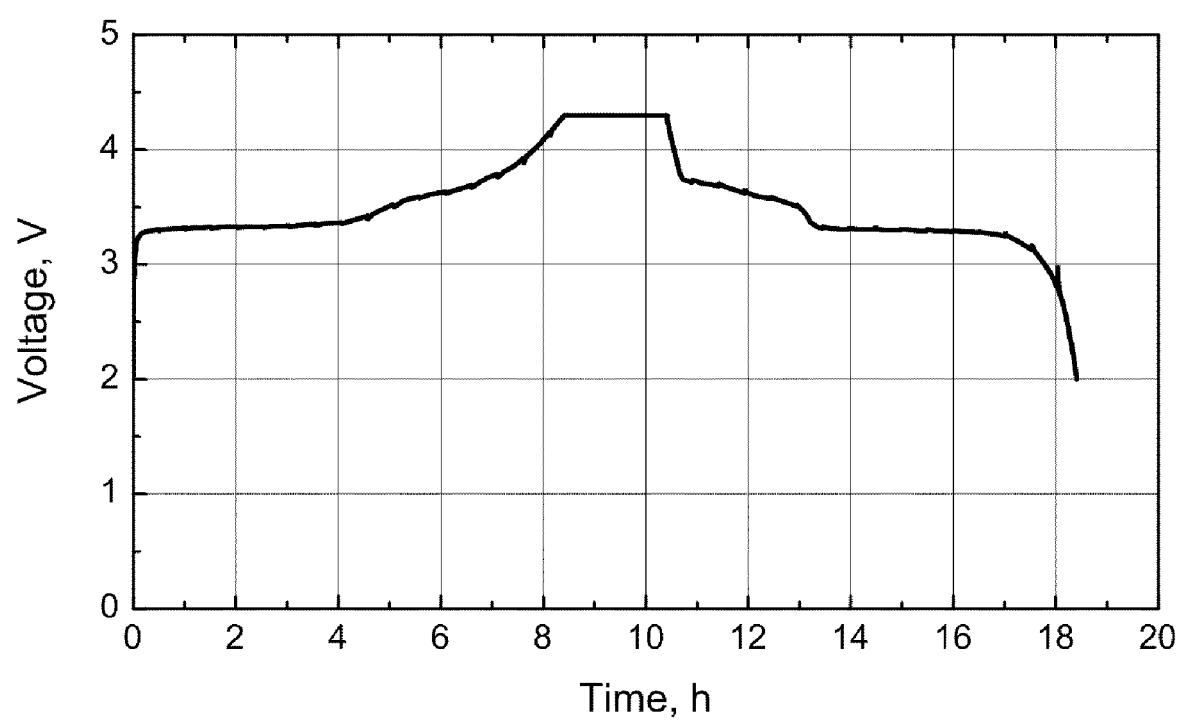
FIG. 10 is a plot showing the voltage profile of a $LiNi_{0.5}Mn_{1.5}O_4/SrLi_2Ti_6O_{14}$ cell.
Figure 11:
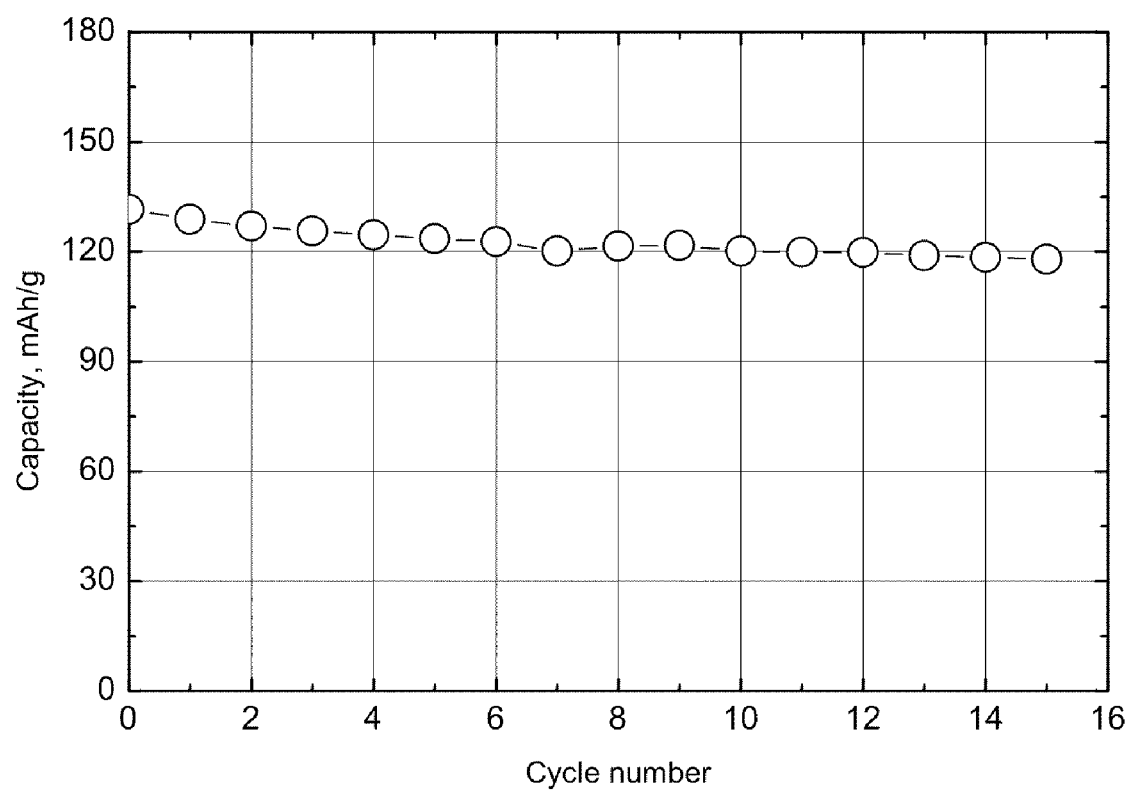
FIG. 11 is a plot showing the delivered discharge capacity (mAh/g) of a $LiNi_{0.5}Mn_{1.5}O_4/SrLi_2Ti_6O_{14}$ cell.

FIG. 10 shows the voltage profile of a cell made of $LiNi_{0.5}Mn_{1.5}O_4$ as a positive electrode and $SrLi_2Ti_6O_{14}$ as a negative electrode. The cell delivers a specific discharge capacity of 120 mAh/g at C/5 rate. FIG. 11 shows the cycle stability of a cell fabricated with this chemistry.

It should be understood that the above description of the invention and the specific examples and embodiments therein, while indicating the preferred embodiments of the present invention, are given only by demonstration and not limitation. Many changes and modification within the scope of the present invention may therefore be made without the parting from the spirit of the invention, and the invention includes all such changes and modifications.

We claim:

1. A lithium insertion material for a non-aqueous lithium ion battery having the general formula $M_{1-x}A_xLi_{2-y}B_yTi_{6-z}Mn_zO_{14-t}Q_t$;

wherein:

M is selected from the group consisting of Ba, Sr, Ca, Mg, Pb, Sn, and divalent cations;

0<x<0.5;

0<y<0.5;

0<z<0.5;

0<t<0.5;

A, B and C are at least one divalent, trivalent or tetravalent metal and

Q is at least one monovalent or divalent anion.

2. The lithium insertion material of claim 1, wherein the lithium insertion material is a cathode material for non-aqueous lithium ion batteries.

3. The lithium insertion material of claim 1, wherein the lithium insertion material is an anode material for non-aqueous lithium ion batteries.

4. The lithium insertion material of claim 1, wherein $Ti^{4+}$ cations are partially reduced to $Ti^{3+}$ cations.

5. The lithium insertion material of claim 1, further comprising a coating of a material selected from the group consisting of a conductive metals, a metal oxide, a carbonaceous compound and combinations thereof.

6. A positive electrode comprising the lithium insertion material of claim 1.

7. A non-aqueous lithium ion battery, comprising the positive electrode as described in claim 6, an electrolyte and a negative electrode.

8. A negative electrode comprising the lithium insertion material of claim 1.

9. A non-aqueous lithium ion battery, comprising a positive electrode, an electrolyte and the negative electrode material of claim 8.

10. A non-aqueous lithium ion battery, comprising a positive electrode, an electrolyte and the lithium insertion material of claim 1.

11. A non-aqueous lithium ion battery, comprising a positive electrode, an electrolyte and the lithium insertion material of claim 5.

* * * * *